United States Patent
Sala et al.

(10) Patent No.: US 9,085,340 B1
(45) Date of Patent: Jul. 21, 2015

(54) ELECTRONIC FRONT DERAILLEUR

(71) Applicant: TIEN HSIN INDUSTRIES CO., LTD., Taichung (TW)

(72) Inventors: Alfredo Sala, Taichung (TW); Douglas Chiang, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 14/211,063

(22) Filed: Mar. 14, 2014

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/132* | (2010.01) |

(52) U.S. Cl.
CPC ..................... *B62M 9/132* (2013.01)

(58) Field of Classification Search
CPC .... B62M 9/1342; B62M 9/124; B62M 9/134; B62M 9/126; B62M 9/122
USPC ...................................... 474/80, 82
See application file for complete search history.

(56) References Cited

U.S. PATENT DOCUMENTS

| | | | | |
|---|---|---|---|---|
| 3,863,512 A * | 2/1975 | Crawley | ........................ | 474/80 |
| 3,919,891 A * | 11/1975 | Stuhlmuller et al. | ........... | 474/70 |
| 5,328,414 A * | 7/1994 | Ancarani Restelli | ........... | 474/80 |
| 5,480,356 A * | 1/1996 | Campagnolo | .................. | 474/70 |
| 5,494,307 A * | 2/1996 | Anderson | .................... | 280/236 |
| 6,162,140 A * | 12/2000 | Fukuda | ........................... | 474/70 |
| 6,623,389 B1 * | 9/2003 | Campagnolo | .................. | 474/70 |
| 6,648,782 B2 * | 11/2003 | Valle | .............................. | 474/78 |
| 6,679,797 B2 * | 1/2004 | Valle | .............................. | 474/80 |
| 6,726,586 B2 * | 4/2004 | Fukuda | ........................... | 474/70 |
| 6,740,003 B2 * | 5/2004 | Fukuda | ........................... | 477/78 |
| 6,890,276 B2 * | 5/2005 | Valle | .............................. | 474/83 |
| 6,979,009 B2 * | 12/2005 | Ichida et al. | .................. | 280/238 |
| 6,997,835 B2 * | 2/2006 | Fukuda | ........................... | 474/82 |
| 7,001,294 B2 * | 2/2006 | Fukuda | ........................ | 474/102 |
| 7,255,660 B2 * | 8/2007 | Del Pra | .......................... | 474/82 |
| 7,290,458 B2 * | 11/2007 | Fukuda | ........................... | 74/82 |
| 7,291,079 B2 * | 11/2007 | Ichida et al. | .................... | 474/80 |
| 7,306,531 B2 * | 12/2007 | Ichida et al. | .................... | 474/70 |
| 7,341,532 B2 * | 3/2008 | Ichida et al. | .................... | 474/70 |
| 7,381,142 B2 * | 6/2008 | Campagnolo | .................. | 474/70 |
| 7,442,136 B2 * | 10/2008 | Ichida et al. | .................... | 474/82 |
| 7,503,863 B2 * | 3/2009 | Ichida et al. | .................... | 474/80 |
| 7,704,173 B2 * | 4/2010 | Ichida et al. | .................... | 474/82 |
| 7,892,122 B2 * | 2/2011 | Fukuda | ........................... | 474/82 |
| 8,002,655 B2 * | 8/2011 | Meggiolan | ..................... | 474/82 |
| 8,033,937 B2 * | 10/2011 | Meggiolan | ..................... | 474/70 |
| 8,137,223 B2 * | 3/2012 | Watarai et al. | ................ | 474/110 |
| 8,202,182 B2 * | 6/2012 | Ishikawa et al. | ................ | 474/82 |
| 8,602,929 B2 * | 12/2013 | Ishikawa et al. | ................ | 474/82 |

(Continued)

*Primary Examiner* — Henry Liu
(74) *Attorney, Agent, or Firm* — WPAT, PC; Justin King (57) ABSTRACT

The present invention provides an electronic front derailleur including a driving member, a driving pulley, a driven pulley, a transmission shaft, a transmission assembly, and a chain guide member disposed with a chain-moving member connected to the transmission assembly, wherein the chain-moving member is disposed with a groove to receive a chain. When the driving member drives the driving pulley to rotate the driven pulley, then the driven pulley further actuates the transmission shaft to move therewith, and then the transmission assembly and the chin guide member are further driven to make movements, allowing the bicycle chain move from one sprocket to another sprocket with a different size.

10 Claims, 9 Drawing Sheets

(56) References Cited

U.S. PATENT DOCUMENTS

| | | | |
|---|---|---|---|
| 8,979,683 B2 * | 3/2015 | Katsura et al. | 474/80 |
| 2002/0061797 A1 * | 5/2002 | Valle | 474/70 |
| 2003/0027674 A1 * | 2/2003 | Valle | 474/70 |
| 2003/0092519 A1 * | 5/2003 | Fukuda | 474/70 |
| 2003/0207732 A1 * | 11/2003 | Fukuda | 474/80 |
| 2004/0014541 A1 * | 1/2004 | Dal Pra | 474/70 |
| 2004/0063528 A1 * | 4/2004 | Campagnolo | 474/70 |
| 2004/0102268 A1 * | 5/2004 | Valle | 474/80 |
| 2004/0102269 A1 * | 5/2004 | Fukuda et al. | 474/82 |
| 2005/0187048 A1 * | 8/2005 | Fukuda | 474/70 |
| 2005/0192137 A1 * | 9/2005 | Ichida et al. | 474/70 |
| 2005/0192139 A1 * | 9/2005 | Ichida et al. | 474/80 |
| 2005/0192140 A1 * | 9/2005 | Meggiolan | 474/80 |
| 2005/0266945 A1 * | 12/2005 | Meggiolan | 474/70 |
| 2006/0183584 A1 * | 8/2006 | Fukuda | 474/70 |
| 2006/0189421 A1 * | 8/2006 | Ichida et al. | 474/80 |
| 2006/0199688 A1 * | 9/2006 | Dal Pra | 474/70 |
| 2006/0211528 A1 * | 9/2006 | Campagnolo | 474/70 |
| 2008/0132364 A1 * | 6/2008 | Ichida et al. | 474/70 |
| 2008/0227572 A1 * | 9/2008 | Sakaue | 474/82 |
| 2009/0098963 A1 * | 4/2009 | Watarai et al. | 474/80 |
| 2009/0111625 A1 * | 4/2009 | Valle et al. | 474/80 |
| 2009/0215561 A1 * | 8/2009 | Fukuda | 474/82 |
| 2014/0114538 A1 * | 4/2014 | Shipman et al. | 701/51 |
| 2014/0121047 A1 * | 5/2014 | Katsura et al. | 474/80 |
| 2014/0155206 A1 * | 6/2014 | Johnson et al. | 474/80 |
| 2014/0213397 A1 * | 7/2014 | Yamaguchi et al. | 474/80 |
| 2014/0235383 A1 * | 8/2014 | Wesling | 474/80 |
| 2014/0243127 A1 * | 8/2014 | Pasqua et al. | 474/80 |
| 2014/0243128 A1 * | 8/2014 | Pasqua et al. | 474/80 |
| 2014/0243129 A1 * | 8/2014 | Pasqua et al. | 474/82 |
| 2014/0243130 A1 * | 8/2014 | Pasqua et al. | 474/82 |

* cited by examiner

ELECTRONIC FRONT DERAILLEUR

BACKGROUND OF THE INVENTION

1. Field of the Invention

The present invention relates to a derailleur for bicycle, and more particularly, to an electronic front derailleur structure for bicycle.

2. Description of Related Art

As in bicycle structures, generally, front derailleur is fixed on the bicycle frame, corresponding to the position of a front sprocket. This allows the front derailleur to move the chain that meshed with the front sprocket and a rear sprocket to other target sprocket having predetermined size and number of teeth, in order to achieve the function of gear shifting.

Conventional front derailleur is manually operated. It is controlled by a control lever disposed on the bicycle handle through a cable, whereas the user may press the control lever, creating an upward or downward movement of the front derailleur, to move the chain towards the target sprocket, thereby completing the gear-shifting function.

However, with bicycles becoming a more advanced mode for transportation and sport, manually-operated gear-shifting structure is gradually being eliminated and replaced by electronic gear-shifting structure. The electronic front derailleur structure is driven by electrical motor, shifting the derailleur to allow the bicycle chain to move to a different sprocket, thereby achieving the gear-shifting function.

Figure 1:
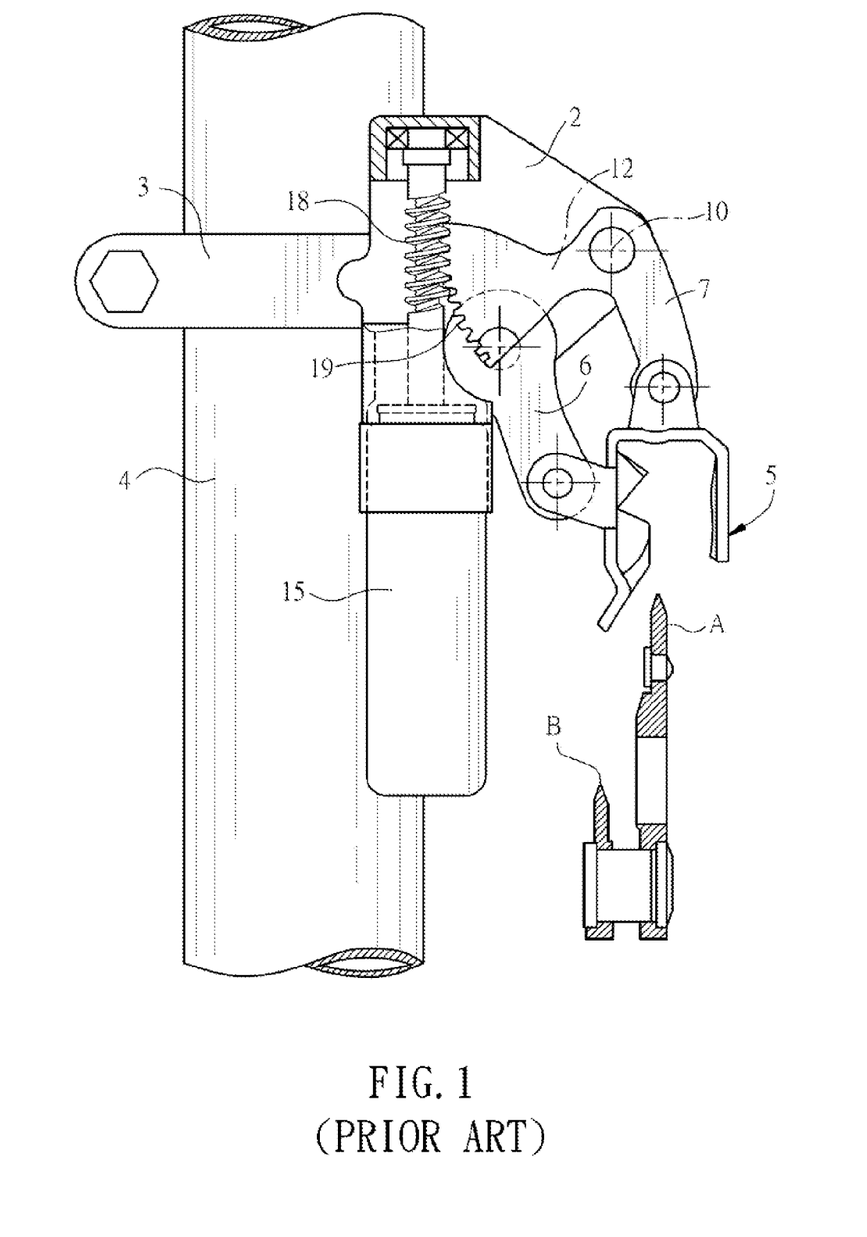
FIG. 1 is a plan view of a prior art disclosed in U.S. Pat. No. 6,679,797 B2, "Front derailleur for bicycle with electrical motor and gear reducer;"

According to the prior art, FIG. 1 illustrates U.S. Pat. No. 6,679,797 B2, "Front derailleur for bicycle with electrical motor and gear reducer," which disclosed a front bicycle derailleur comprising a supporting body 2, a band 3 of ring shape, a connecting member 6, an articulated arm 7 and a chain guide 5. The band 3 is pivotally connected with the supporting body 2, and is fastened to a bicycle frame 4. The supporting body 2 includes a penetrating shaft 10 pivotally attached to the articulated arm 7. One end of the articulated arm 7 is pivotally attached to the chain guide 5. The chain guide 5 has a groove receiving a bicycle chain. The other end of the articulated arm 7 has a fan-shaped sprocket 12; tooth part 19 of the sprocket 12 meshes with a worm screw 18. One end of the worm screw 18 is connected to an electrical motor 15. One end of the connecting member 6 is connected to the chain guide 5, and the other end thereof is connected to the supporting body 2.

When in use, the electrical motor 15 drives the worm screw 18 to rotate, allowing the worm screw 18 to mesh with the tooth part 19 and further driving the sprocket 12 to rotate around the center of the penetrating shaft 10. This allows the chain guide 5 connected to the articulated arm 7 to move upwards and downwards, and the connecting member 6 connecting the chain guide 5 and the supporting body 2 may pull the chain guide 5 towards or away from the bicycle frame 4, enabling the chain guide 5 to move the chain to the target sprocket A or B, thereby achieving the gear-shifting function.

In operation, while riding on a bicycle, shock and impact caused by all kinds of road-riding situations may occur frequently. In particular, when the chain guide 5 is impacted, the impact force is transmitted to the articulated arm 7 and the connecting member 6, through the sprocket 12, and then impact on the worm screw 18; this stops the worm screw 18 from being meshed with the tooth part 19 of the articulated arm 7, thereby causing the problem of jammed or imprecise gear transmission. The shock may even damage the electrical motor 15, causing the problem of jammed or inaccurate chain movement during gear shifting process.

SUMMARY OF THE INVENTION

Hence, a primary object of the present invention is to provide an electronic front derailleur that can solve the aforesaid jammed or imprecise gear shifting problems caused by the impact force generated by shock occurring on the bicycle.

To achieve the object, the present invention provides an electronic front derailleur mounted to a bicycle frame, wherein a bicycle chain meshed with a sprocket is moved to another sprocket having different size. The electronic front derailleur includes a driving member, a driving pulley, a driven pulley, a transmission shaft, a transmission assembly, and a chain guide member to receive a chain.

When performing gear shifting, the driving member drives the driving pulley to rotate, enabling the driving pulley to rotate the driven pulley. The transmission shaft is further actuated by the driven pulley, allowing the transmission shaft to have an upward and downward movement, thereby driving the transmission assembly to move the chain guide member to rotate forward or backward, thereby moving the chain going through the groove of the chain guide member to a different sprocket with a predetermined diameter.

When the electronic front derailleur according to the present invention receives impact, the impact force transmission follows the path described as below: the force is first transmitted to the chain guide member, and then sequentially, the transmission assembly, the transmission shaft, the driven pulley, the driving pulley, and the driving member. However, when the force is transmitted to the transmission shaft and yet to be transmitted to the driven pulley, since the transmission shaft is screwed to the driven pulley, the force transmitted upward from the transmission shaft is cushioned by the driven pulley and the threaded shaft body, stopping the impact force from being transmitted to the driven pulley, and thereby preventing the impact from being further transmitted to the driving pulley and the driving member. This can effectively prevent the driving pulley and the driven pulley from being mis-shifted or jammed, and can solve the problem of jammed or imprecise gear shifting caused by the situation in that upon receiving impact shock, the precision of the driving pulley is lowered and thereby stopping the driving member from driving the driving pulley to rotate.

DETAILED DESCRIPTION OF THE INVENTION

Figure 2:
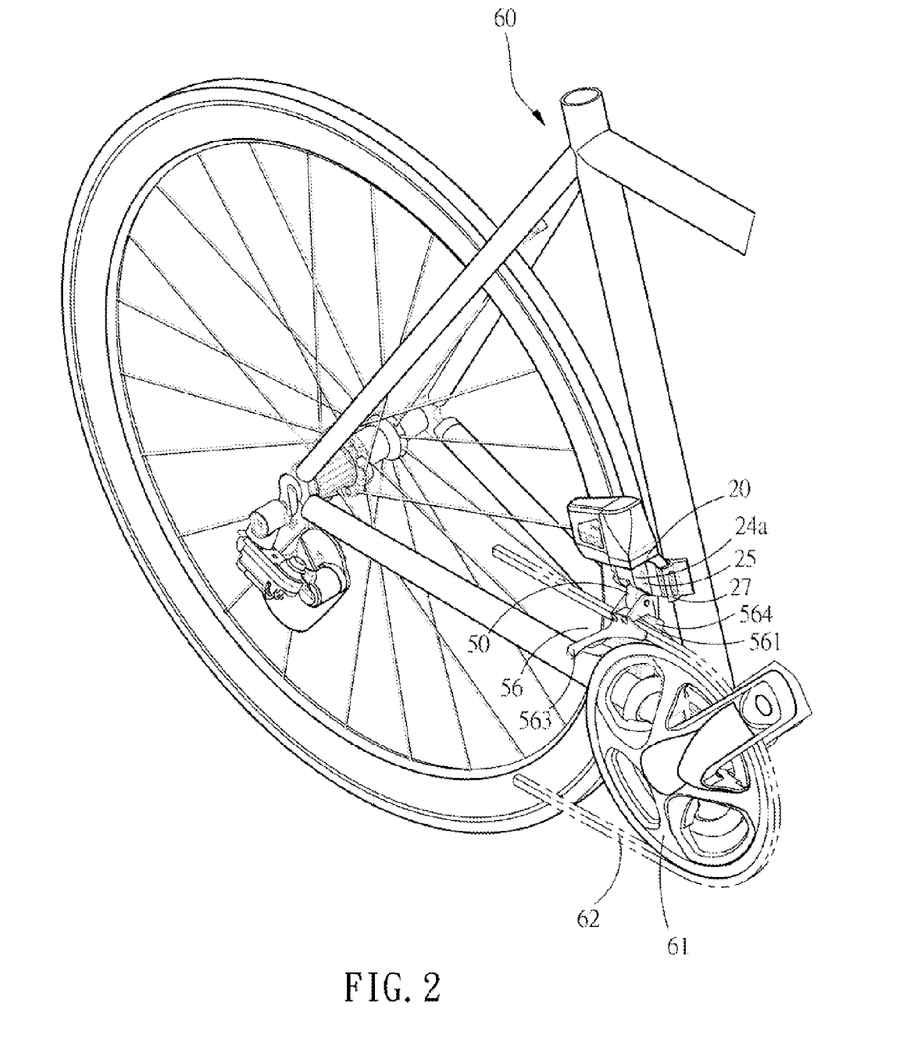
FIG. 2 illustrates the electronic front derailleur according to the embodiment of the present invention being mounted to a bicycle.
Figure 3:
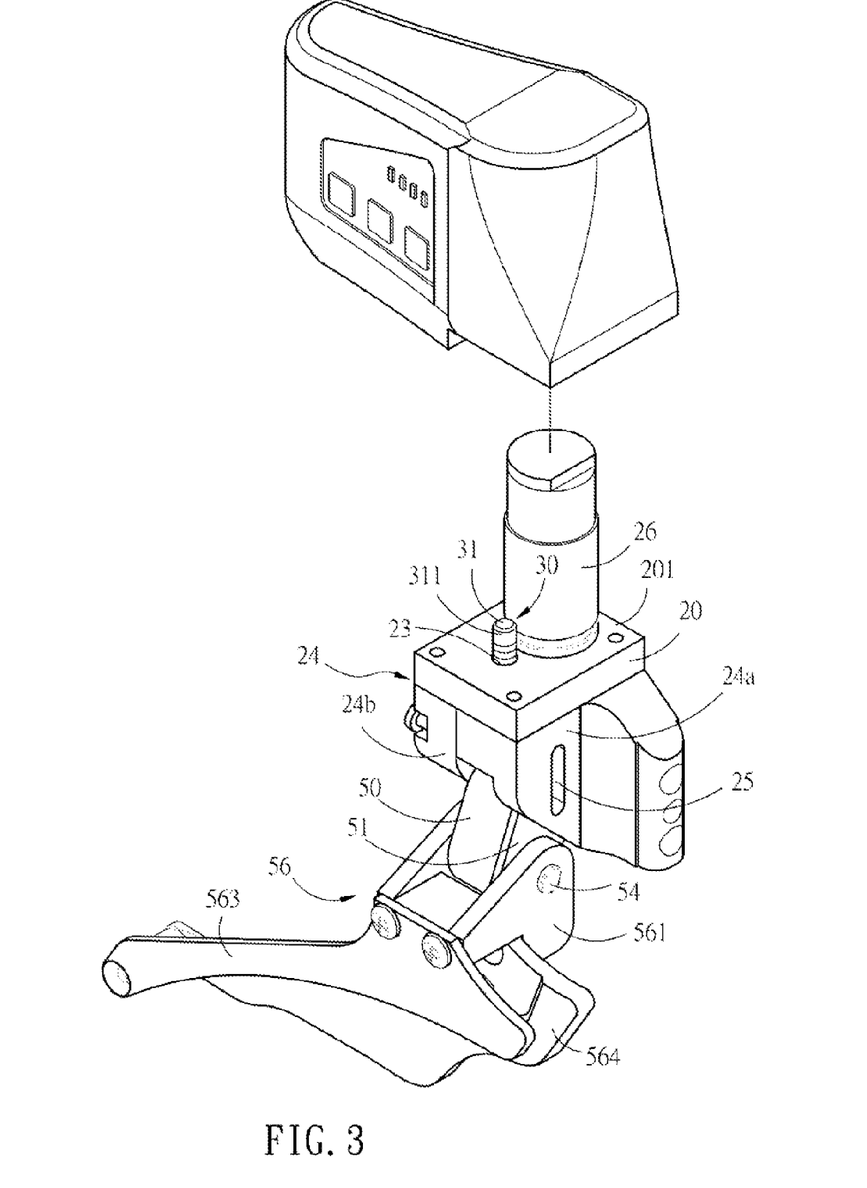
FIG. 3 is an enlarged view of the electronic front derailleur according to the embodiment of the present invention.
Figure 4:
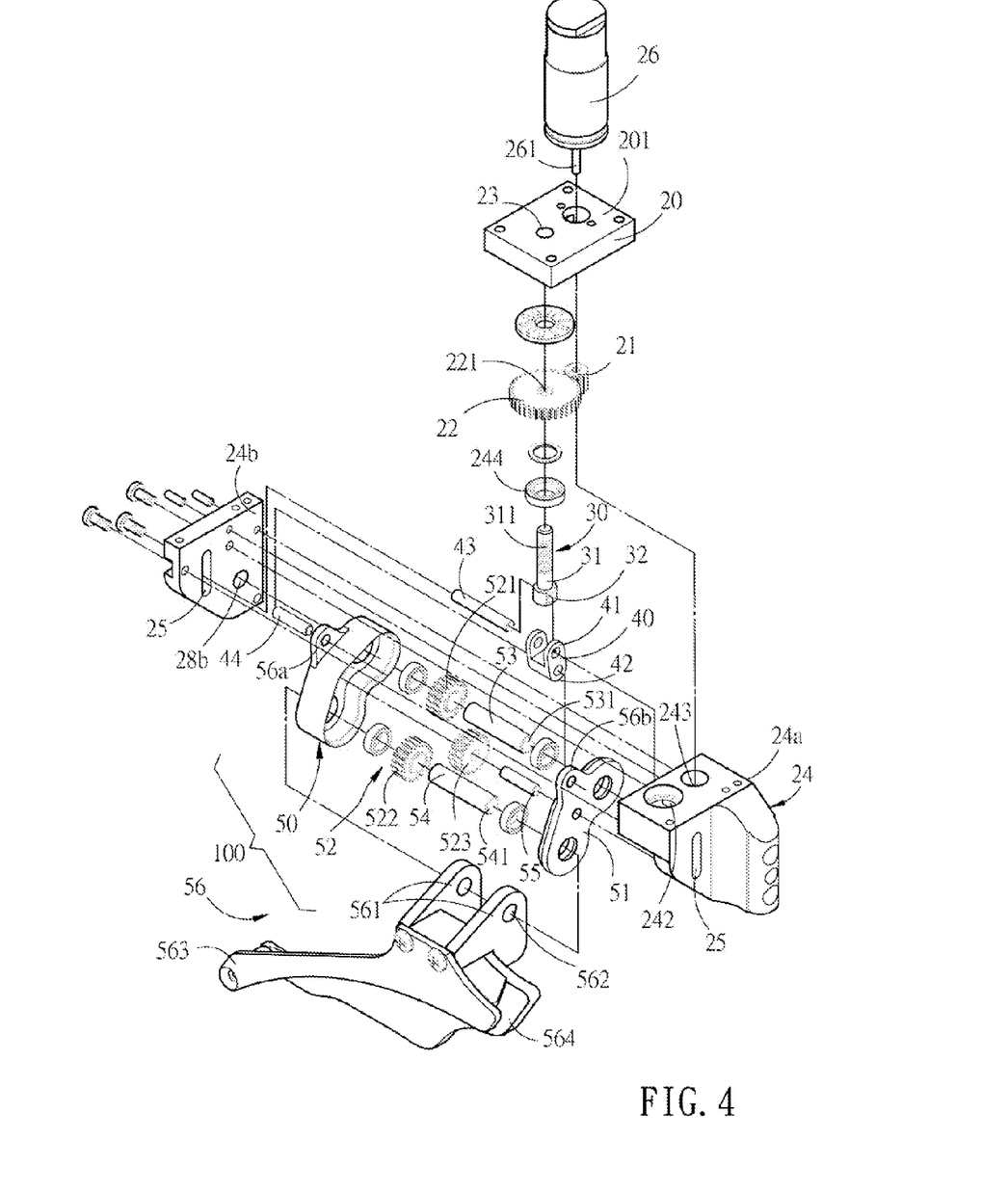
FIG. 4 is an exploded perspective view of the electronic front derailleur according to the embodiment of the present invention.
Figure 4A:
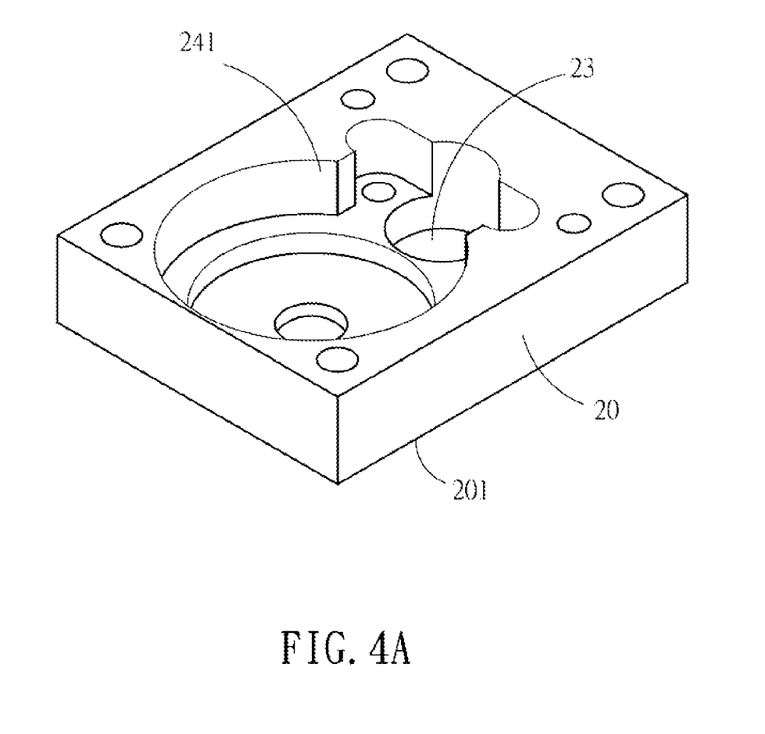
FIG. 4A is a perspective view, viewed from another direction, of the supporting body of the electronic front derailleur according to the embodiment of the present invention.
Figure 5:
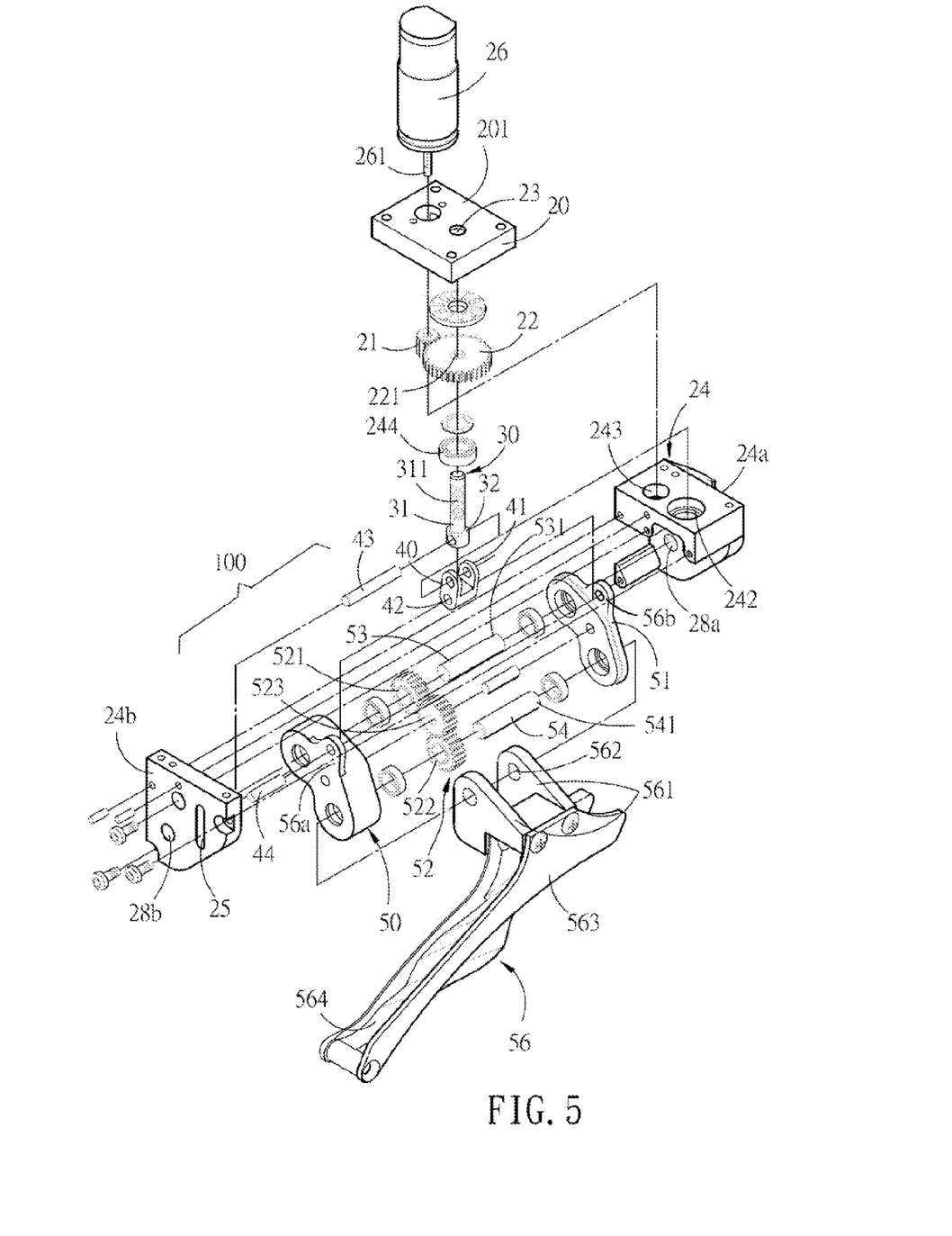
FIG. 5 is an exploded perspective view, viewed from another direction, of the electronic front derailleur according to the embodiment of the present invention.

Please refer to FIGS. 2, 3, 4, 4A and 5. FIG. 2 illustrates the electronic front derailleur according to the embodiment of the present invention being mounted to a bicycle in practice. FIG. 3 is an enlarged view of the electronic front derailleur according to the embodiment of the present invention. FIG. 4 is an exploded perspective view of the electronic front derailleur according to the embodiment of the present invention. FIG. 5 is an exploded perspective view, viewed from another direction, of the electronic front derailleur according to the embodiment of the present invention.

According to the present invention, an electronic front derailleur is provided. Wherein, a mounting base 27 is used to mount the electronic front derailleur to a bicycle frame 60. The frame 60 comprises a front sprocket set 61 including at least two front sprockets with different diameters, a rear sprocket set (not shown), and a chain 62 connecting the front sprocket 61 and the rear sprocket. The chain 62 is moved from one sprocket to another sprocket with different size. The electronic front derailleur according to the present invention includes a supporting body 20, a driving member 26, a driving pulley 21, a transmission shaft 30, a transmission assembly 100 and a chain guide member 56. The transmission assembly 100 further includes a connecting member 40 and a cushion member 50.

The supporting body 20 includes a top part 201 and a main body 24. The top part 201 is disposed with a through hole 23, and the main body 24 has a first side board 24a and a second side board 24b correspondingly connected to each other. One surface of the supporting body 20 facing the first side board 24 is disposed with a receiving space 241 as shown in FIG. 4A. The first side board 24 has a bearing hole 242 and a through hole 243, wherein the bearing hole 242 is fitted with a shaft bearing 244. The first side board 24a is disposed with a first fixing hole 28a, the second side board 24b is disposed with a second fixing hole 28b corresponding to the first fixing hole 28a, a long-shaped guide groove 25 is disposed at the first side board 24a and the second side board 24b, respectively.

In the present embodiment, the driving member 26 is an electric motor having a driving shaft 261. The first side board 24a is fixed to the frame 60 by the mounting base 27, wherein the driving member 26 is disposed at the top part 201, and the driving shaft 261 passes through the supporting body 20 and is movably connected to the driving pulley 21. The bottom of the driving pulley 21 is disposed in the through hole 243.

The transmission shaft 30 has a shaft body 31 and a head part 32, and the transmission assembly 100 is connected to the head part 32 and the chain guide member 56 respectively. The transmission shaft 30 passes through the first side board 24a from below, allowing the shaft body 31 to fit with a central hole of the shaft bearing 244. The receiving space 241 is disposed with the driving pulley 21 and a driven pulley 22. According to the embodiment, the driving pulley 21 and the driven pulley 22 are gearwheels, wherein the outer diameter and the number of teeth of the driving pulley 21 are smaller than that of the driven pulley 22. The driving pulley 21 and the driven pulley 22 only make rotating with no displacement inside the receiving space 241. The driving pulley 21 is driven to rotate by the driving member 26, thereby meshing with the driven pulley 22, and further transmitting the rotary motion from the driving pulley 21 to the driven pulley 22. In addition, a screw hole 221 is disposed at the center of the driven pulley 22, and the shaft body 31 of the transmission shaft 30 is disposed with screw thread 311 in order to be screwed to the screw hole 221.

The connecting member 40 includes a first end 41 and a second end 42 corresponding to the first end 41. A first bolt rod 43 passes through the head part 32 and the first end 41 respectively, allowing the head part 32 and the first end 41 to pivotally rotate around the first bolt rod 43 with using it as a center of pivotal movement. The second end 42 of the connecting member 40 is pivotally connected to a second bolt rod 44 and two ends of the second bolt rod 44 are fitted to two guide grooves 25 of the first side board 24a and the second side board 24b respectively, enabling the second bolt rod 44 to move along the guide grooves 25.

In the preferred embodiment of the present invention, the cushion member 50 is formed with hollow-shaped and is placed between the first side board 24a and the second side board 24b, connecting to the connecting member 40. The cushion member 50 includes an opening, a cover 51 to cover the opening and a lifting lug 56a disposed at the periphery of the cushion member 50. The cover 51 is disposed with a lifting lug 56b corresponding to the lifting lug 56a, and the second bolt rod 44 passes through the two lifting lugs 56a, 56b, allowing the cushion member 50 and the connecting member 40 to pivotally connected to each other, and pivotally rotate around the second bolt rod 44 with using it as a center of pivotal movement.

A gear set 52 is disposed inside the cushion member 50. The gear set 52 includes a primary gear 521, a secondary gear 522 and an intermediate gear 523 that meshes with the primary gear 521 and the secondary gear 522. In the present embodiment, the primary gear 521 is fixed to a first fixing shaft 53, and the first fixing shaft 53 passes through the cushion member 50, the cover 51, the first fixing hole 28a and the second fixing hole 28b, allowing the cushion member 50 to be disposed to the main body 24. At least one of the two ends of the first fixing shaft 53 includes a first fixing end 531. In the present embodiment, the first fixing end 531 is the one end disposed through the first side board 24a. The first fixing end 531 has a non-circular cross section, and the first fixing hole 28a has a shape match with that of the first fixing end 531, thereby stationarily fixing the first fixing shaft 53 to the first fixing hole 28a, and further allowing the cushion member 50 to rotate around the first fixing shaft 53. The secondary gear 522 is fixed to a second fixing shaft 54, wherein two ends of the second fixing shaft 54 are disposed at the cushion member 50 and the cover 51, respectively. Similarly, at least one of the two ends of the second fixing shaft 54 includes a second fixing end 541, wherein the second fixing end 541 has a non-circular cross section. In the present embodiment, the second fixing end 541 is the one end disposed through the cover 51 of the cushion member 50. The intermediate gear 523 is connected by a mandrel 55, wherein two ends of the mandrel 55 are pivotally connected to the cushion member 50 and the cover 51, respectively.

The chain guide member 56 includes a chain-moving member 563, and two walls 561 corresponding to each other. Two fastening holes 562 are disposed at each of the two walls 561 respectively and at least one of the fastening holes 562 has a shape matching that of the second fixing end 541. In the present embodiment, the fastening hole 562 at the same side as the cover 51 has the shape matching that of the second fixing end 541. The second fixing shaft 54 is disposed through the two fastening holes 562 with the second fixing end 541 fitted with the fastening hole 562, hence the relative position of the chain guide member 56 and the secondary gear 522 is fixed. The chain-moving member 563 is disposed with a groove 564 to receive a bicycle chain 12.

Figure 6:
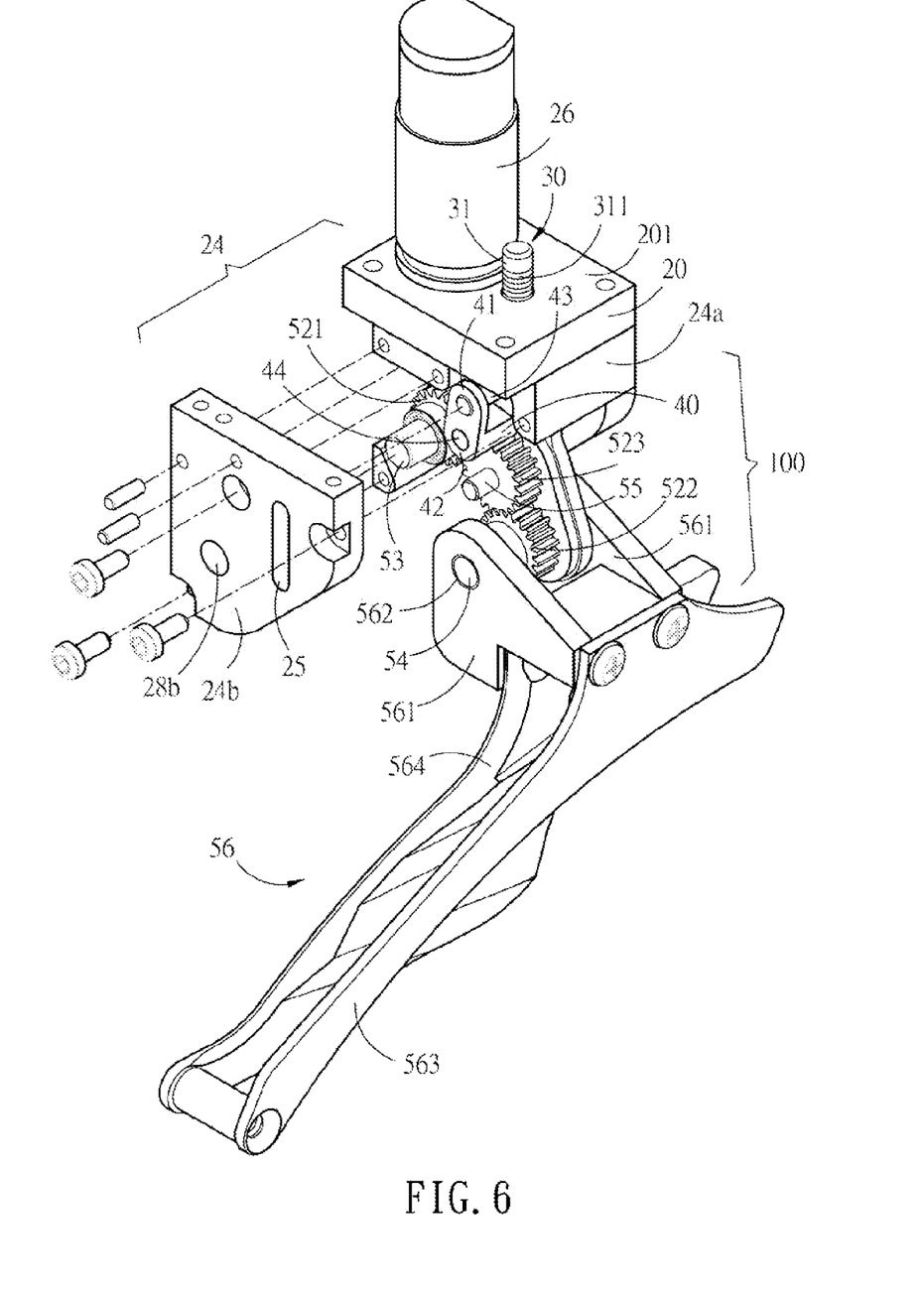
FIG. 6 is a partial exploded view of the electronic front derailleur according to the embodiment of the present invention.
Figure 7A:
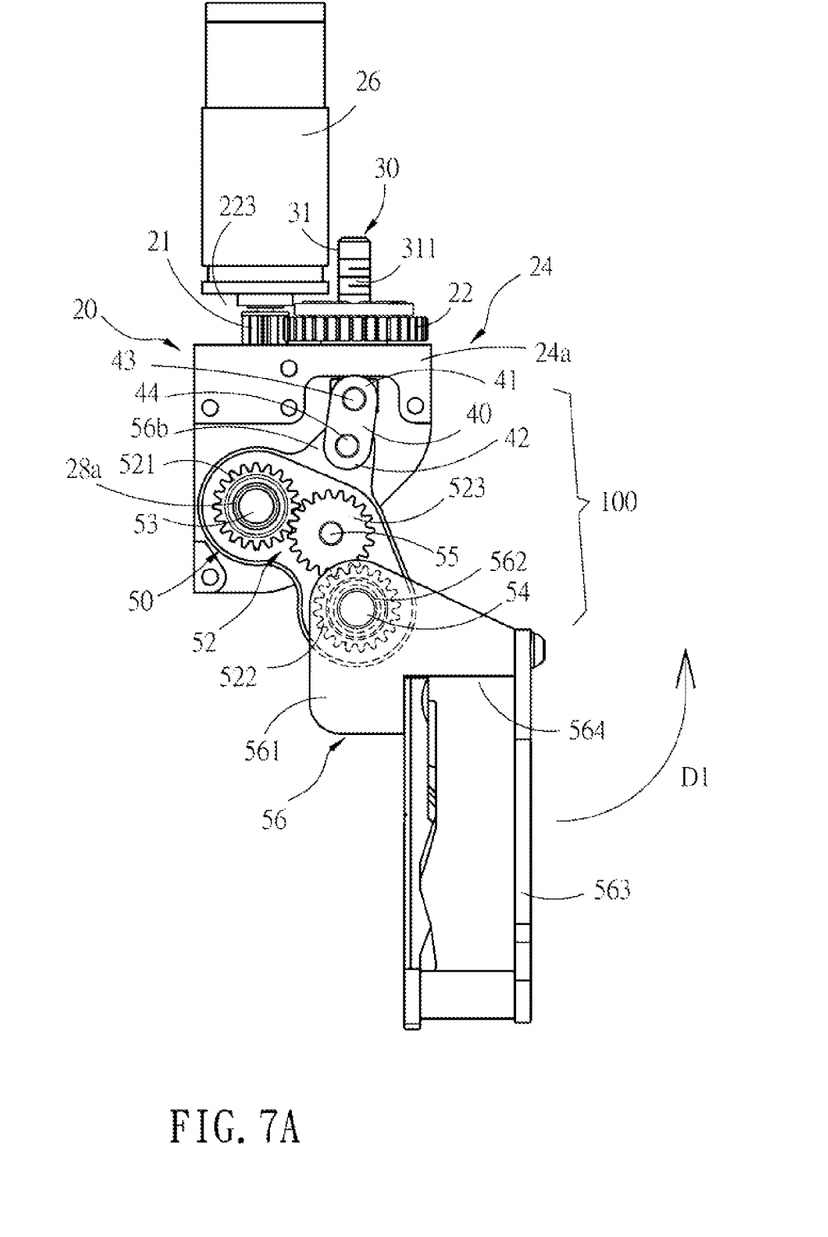
FIG. 7A is a view showing the driving member of the electronic front derailleur before actuating according to the embodiment of the present invention.
Figure 7B:
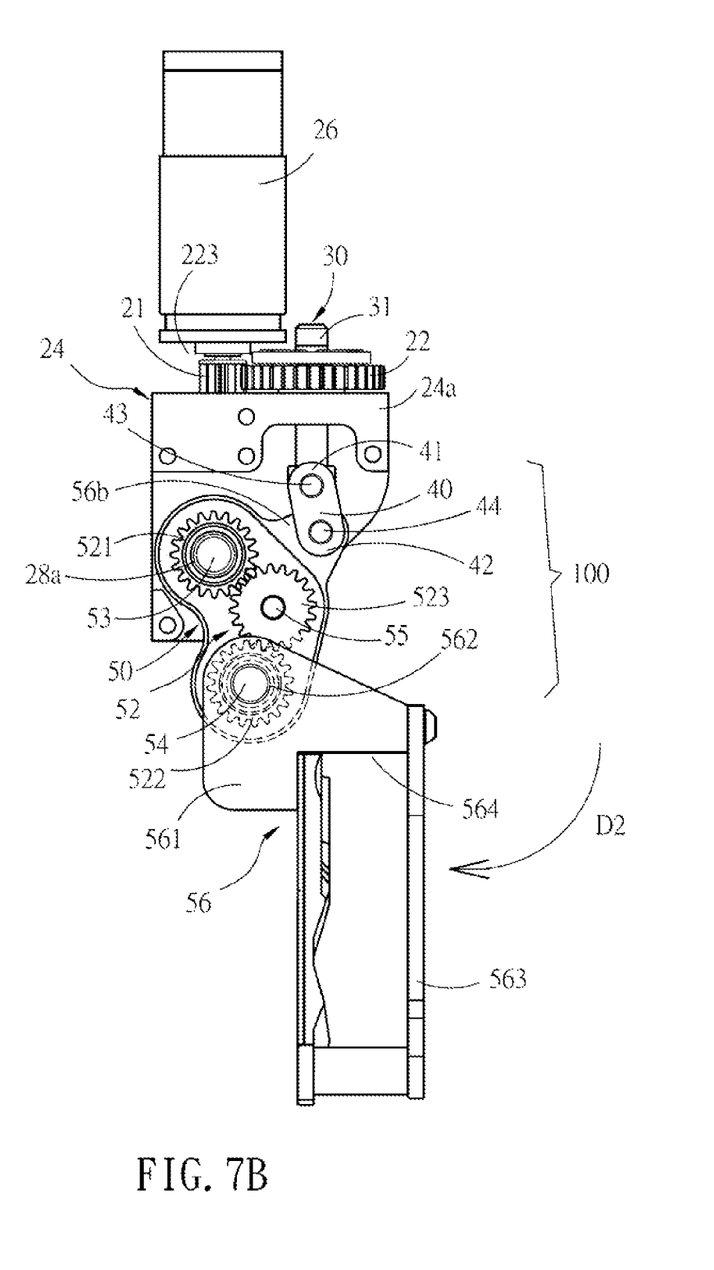
FIG. 7B is a view showing the driving member of the electronic front derailleur after actuating according to the embodiment of the present invention.

Please further refer to FIGS. 6, 7A and 7B. FIG. 6 is a partial exploded view of the electronic front derailleur according to the embodiment of the present invention. FIG. 7A is a view showing the driving member 26 of the electronic front derailleur before actuating according to the embodiment of the present invention. FIG. 7B is a view showing the driving member 26 of the electronic front derailleur after actuating according to the embodiment of the present invention. The driving member 26 according to the present invention drives the driving pulley 21 to rotate forward, thereby driving the driven pulley 22 to rotate. In addition, the outer diameter and the number of teeth of the driving pulley 21 are smaller than that of the driven pulley 22, this arrangement may reduce the error occurs in the procedure described above and further enhance the accuracy of the whole derailleur structure according to the present invention.

The screw thread 311 of the transmission shaft 30 is screwed to the screw hole 221, allowing the transmission shaft 30 to move upwards, thereby further driving the connecting member 40 to move upwards. The connecting member 40 is pivotally connected to the first bolt rod 43, and the first bolt rod 43 is disposed through the two guide grooves 25 of the first side board 24a and the second side board 24b, hence the connecting member 40 is forced to move along the direction of the two guide grooves 25, going upwards therewith. At this time, since the cushion member 50 is pivotally connected to the two lifting lugs 56a and 56b by the connecting member 40, the cushion member 50 is driven to rotate around the first fixing shaft 53 when the connecting member 40 moves. The lifting lugs 56a and 56b are pivotally connected to the second bolt rod 44 shall swing, thereby reducing the additional resisting force caused by the geometric structure of the connecting member 40 and the cushion member 50 during transmission.

During rotation, the cushion member 50 and the primary gear 521 are fixed by the first fixing shaft 53, therefore the cushion member 50 may rotate around the first fixing shaft 53 with using it as a center of pivotal movement. The motion transmission shall be provided by the primary gear 521 of the gear set 52, and the intermediate gear 523 fixed to the cushion member 50 by the mandrel 55 is driven by the cushion member 50 to rotate along the periphery of the primary gear 521, thereby driving the chain guide member 56 to move simultaneously. The chain 62 goes through the groove 564 of the chain-moving member 563, and the chain-moving member 563 shall drive the chain 62 to make a forward movement D1, allowing the chain 62 to move from a sprocket with a smaller outer diameter to a sprocket with a larger outer diameter, thereby achieving the goal of increasing the speed.

On the contrary, referring to FIG. 7B, when the driving member 26 drives the driving pulley 21 to rotate backwards, the foregoing mechanism operates toward an opposite direction causing the chain-moving member 563 to make a backward movement D2, further driving the chain 62 to move from a sprocket with a larger outer diameter to a sprocket with a smaller outer diameter, thereby achieving the goal of decreasing the speed.

By changing the direction of force transmission, the present invention can protect the driving member 26, the driving pulley 21 and the driven pulley 22 from being harmed by the impact force. When the chain guide member 56 receives impact, the impact force transmission follows the path described as below: the force is first transmitted to the chain guide member 56, and then sequentially to the cushion member 50, the connecting member 40, the transmission shaft 30, the driven pulley 22, the driving pulley 21, and the driving member 26. However, when the force is transmitted to the transmission shaft 30 and yet to be transmitted to the driven pulley 22, since the transmission shaft 30 is screwed to the screw hole 221 of the driven pulley 22, the force transmitted upward from the transmission shaft 30 is absorbed and cushioned by the screw hole 221 and the screw thread 311 of the transmission shaft 30, stopping the impact force from being transmitted to the driven pulley 22, thereby preventing the impact from being further transmitted to the driving pulley 21 or even the driving member 26. This can effectively prevent the driving pulley 21 and the driven pulley 22 from being mis-shifted or jammed, and can solve the problem of jammed or imprecise gear shifting caused by the situation in that upon receiving impact shock, the precision of the driving pulley 21 is lowered, and the driving pulley 21 may not be driven by the driving member 26 to rotate.

The previous description of the preferred embodiment is provided to further describe the present invention, not intended to limit the present invention. It is to be noted that any modification apparent to those skilled in the art according to the disclosure within the scope will be construed as being included in the present invention.

What is claimed is:

1. An electronic front derailleur mounted to a bicycle frame, comprising:
   a mounting base (27) used for mounting a supporting body (20) to the bicycle frame;
   a driving member (26), disposed on the supporting body (20) and meshed with a driving pulley (21) so as to drive the driving pulley (21) to rotate a driven pulley (22), and the driven pulley (22) having a screw hole (221) at a center thereof;
   a transmission shaft (30) disposed with a shaft body (31) and a head part (32), the shaft body (31) disposed with a plural of threads (311) to allow the transmission shaft (30) to be screwed to the screw hole (221);
   a transmission assembly (100), disposed on the supporting body (20) and connected to the head part (32) of the transmission shaft (30); and
   a chain guide member (56) disposed with a chain-moving member (563) connected to the transmission assembly (100), wherein the chain-moving member (563) is disposed with a groove to receive a chain (62).

2. The electronic front derailleur of claim 1, wherein the transmission assembly (100) further comprises a connecting member (40) and a cushion member (50), the connecting member (40) has a first end (41) and a second end (42), the first end (41) is pivotally connected to the head part (32), and the second end (42) is pivotally connected to the cushion member (50), the cushion member (50) movably mounted to the supporting body (20) and is connected to the chain guide member (56).

3. The electronic front derailleur of claim 2, wherein the supporting body (20) further comprises a top part (201) and a main body (24), the main body (24) disposed with a first side board (24a) and a second side board (24b) correspondingly connected to each other, and a receiving space (241) disposed between the top part (201) and the main body (24) to receive the driving pulley (21) and the driven pulley (22), the first side board (24a) is disposed with a first fixing hole (28a), the second side board (24b) is disposed with a second fixing hole (28b) corresponding to the first fixing hole (28a); the cushion member (50) further comprises a first fixing shaft (53), a second fixing shaft (54) and a gear set (52), the first fixing shaft (53) passing through the cushion member (50) and two ends thereof connected to the first fixing hole (28a) and the second fixing hole (28b) respectively, and the second fixing shaft (54) disposed through the chain guide member (56) and the cushion member (50).

4. The electronic front derailleur of claim 3, wherein two long-shaped guide grooves (25) are disposed at the first side board (24a) and the second side board (24b) respectively, a first bolt rod (43) is passed through the first end (41) of the connecting member (40) and the head part (32) respectively, and the second end (42) of the connecting member (40) is pivotally connected to the cushion member (50) by a second bolt rod (44), two ends of the second bolt rod (44) fitted to the two guide grooves (25) of the first side board (24a) and the second side board (24b) respectively, allowing the second bolt rod (43) to move along the guide grooves (25).

5. The electronic front derailleur of claim 3, wherein the gear set (52) further comprises a primary gear (521), a secondary gear (522), and an intermediate gear (523) that meshes with the primary gear (521) and the secondary gear (522), the first fixing shaft (53) passing through the primary gear (521) and disposed at the cushion member (50), the second fixing shaft (54) passing through the secondary gear (522) and disposed at the cushion member (52), and the intermediate gear (523) connected by a mandrel (55) pivotally connected to the cushion member (50).

6. The electronic front derailleur of claim 3, wherein the cushion member (50) is hollow-shaped and disposed between the first side board (24a) and the second side board (24b), the cushion body (50) further having an opening and a cover (51) covering the opening, and the gear set (52) disposed in the cushion member (50).

7. The electronic front derailleur of claim 6, wherein a lifting lug (56a) is disposed at peripheral of the cushion member (50), and the cover (51) is disposed with another lifting lug (56b) corresponding to the lifting lug (56a) disposed at the peripheral of the cushion member (50), the second bolt rod (44) passes through the two lifting lugs (56a, 56b).

8. The electronic front derailleur of claim 3, wherein the first fixing shaft (53) has at least a first fixing end (531), the first fixing end (531) disposed with a non-circular cross section, and the first fixing hole (28a) has a shape match with the first fixing end (531); the second fixing shaft (54) has at least a second fixing end (541), the second fixing end (541) disposed with a non-circular cross section, and the second fixing hole (28b) having a shape match with that of the second fixing end (541).

9. The electronic front derailleur of claim 3, wherein the first side board (24a) has a bearing hole (242) and a through hole (243), and the bearing hole (242) is fitted with a bearing (244); the shaft body (31) of the transmission shaft (30) is fitted with a central hole of the bearing (242), and the through hole (243) is disposed at the driving pulley (21).

10. The electronic front derailleur of claim 1, wherein the driving member (26) is an electrical motor.

* * * * *